(12) United States Patent
Kinnunen-Raudaskoski et al.

(10) Patent No.: US 12,077,650 B2
(45) Date of Patent: Sep. 3, 2024

(54) FOAM ASSISTED DRYING PROCESS OF NANO- AND MICROFIBRILLATED CELLULOSE

(71) Applicant: Teknologian tutkimuskeskus VTT Oy, Espoo (FI)

(72) Inventors: Karita Kinnunen-Raudaskoski, Espoo (FI); Tuomo Hjelt, Espoo (FI); Jani Lehmonen, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 691 days.

(21) Appl. No.: 17/297,091

(22) PCT Filed: Nov. 22, 2019

(86) PCT No.: PCT/FI2019/050836
§ 371 (c)(1),
(2) Date: May 26, 2021

(87) PCT Pub. No.: WO2020/109657
PCT Pub. Date: Jun. 4, 2020

(65) Prior Publication Data
US 2022/0025147 A1  Jan. 27, 2022

(30) Foreign Application Priority Data
Nov. 26, 2018 (FI) ..................... 20185996

(51) Int. Cl.
*C08J 9/28* (2006.01)
*C08J 9/00* (2006.01)
*C08J 9/30* (2006.01)
*D21H 11/18* (2006.01)
*D21H 21/56* (2006.01)

(52) U.S. Cl.
CPC ............. *C08J 9/28* (2013.01); *C08J 9/0023* (2013.01); *C08J 9/0033* (2013.01); *C08J 9/30* (2013.01); *D21H 11/18* (2013.01); *D21H 21/56* (2013.01); *C08J 2201/0502* (2013.01); *C08J 2301/02* (2013.01)

(58) Field of Classification Search
CPC . C08J 9/28; C08J 9/0023; C08J 9/0033; C08J 9/30; C08J 2201/0502; C08J 2301/02; D21H 11/18; D21H 21/56
USPC .......................................... 521/64
See application file for complete search history.

(56) References Cited

U.S. PATENT DOCUMENTS

| 10,907,020 B2 * | 2/2021 | Johansson | D21H 27/10 |
| 2013/0171439 A1 | 7/2013 | Shoseyov et al. | |
| 2014/0037816 A1 | 2/2014 | Bakeev et al. | |
| 2016/0289453 A1 | 10/2016 | Cai et al. | |
| 2017/0313838 A1 * | 11/2017 | Johansson | D21H 11/18 |
| 2017/0314200 A1 | 11/2017 | Johansson et al. | |
| 2021/0283260 A1 * | 9/2021 | Hanner | A61K 9/122 |

FOREIGN PATENT DOCUMENTS

| JP | H10158549 A | 6/1998 | | |
| WO | WO2016068787 A1 | 5/2016 | | |
| WO | WO-2018009139 A1 * | 1/2018 | ............. | A61K 47/38 |
| WO | WO-2018171913 A1 * | 9/2018 | ........... | B32B 15/085 |

OTHER PUBLICATIONS

Svagan et al. "Solid cellulose nanofiber—based foams—Toward: facile design of sustained drug delivery systems", Journal of Controlled Release, vol. 244, 2016, pp. 74-82 (Year: 2016).*
Paukkonen et al: Nanofibrillar cellulose hydrogels and reconstructed hydrogels as matrices for controlled drug release. International Journal of Pharmaceutics, Sep. 6, 2017, No. 532, pp. 269-280.
Svagan et al: Solid cellulose nanofiber based foams—Towards facile design of sustained drug delivery systems. Journal of Controlled Release, Nov. 12, 2016, vol. 244, pp. 74-82.

* cited by examiner

*Primary Examiner* — Michael M. Bernshteyn
(74) *Attorney, Agent, or Firm* — Laine IP Oy

(57) ABSTRACT

According to an example aspect of the present invention, there is provided a method for foam assisted drying of nano- and microfibrillated cellulose, which is easily up-scalable and cost-efficient.

20 Claims, 4 Drawing Sheets

| | Drying Energy [kWh/kg] Realized energy | Drying Energy [kWh/kg] Theoretical energy | Total cost [€/tn] Realized cost | Total cost [€/tn] Theoretical cost | Efficiency (theoretical optimum) [%] |
|---|---|---|---|---|---|
| VTT Coarse SDS | 578.9 | 30.7 | 20842.0 | 1105.9 | 5.3 |
| VTT Coarse Mowiflex C30 | 481.6 | 30.7 | 17338.6 | 1105.9 | 6.4 |
| HefCel SDS | 91.6 | 2.1 | 3296.2 | 75.6 | 2.3 |
| HefCel C30 | 57.7 | 2.1 | 2076.9 | 75.6 | 3.6 |
FIG. 7
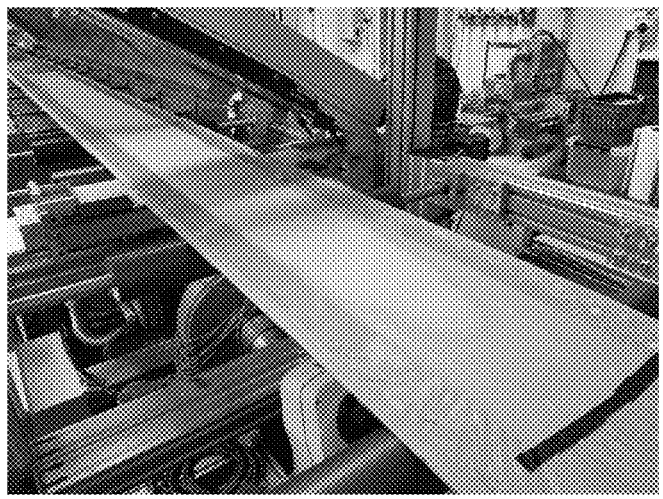
FIG. 8
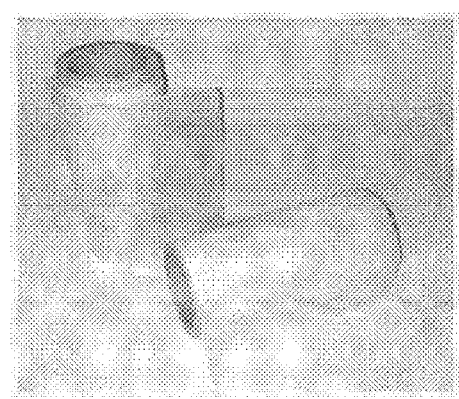
FIG. 9

FOAM ASSISTED DRYING PROCESS OF NANO- AND MICROFIBRILLATED CELLULOSE

FIELD

The present invention relates to a drying method of nano- and/or microfibrillated cellulose, which is assisted by a foam technology.

BACKGROUND

Typically, drying of nano- and microfibrillated cellulose is carried out for example by freeze-drying. This has the drawbacks of being costly and challenging. One challenge relating to freeze drying is film forming, which makes it difficult to break down the formed bonds between the cellulose fibers. Furthermore, freeze-drying is not easily up scalable, and most certainly is not a cost-efficient way to apply it to mill scale.

WO 2016/068787 discloses a method, wherein nanofibrillated cellulose (NFC) foam is formed into a sheet having a thickness of at least 0.1 mm before drying and at least 0.05 mm after drying. The options available for drying and removal of the liquid content from the wet foam, such as size of the production equipment and the time available for production of the cellular solid material, influences the maximum material thickness available. However, this disclosure focuses mainly on producing porous structures from nanofibrillated cellulose via foam technology, but does not describe a method for effective drying of the NFC-material. Structures disclosed in WO 2016/068787 could be produced cost-effectively by first applying the method of the present invention for the drying step of the NFC.

Thus, there is a need for a cost-efficient and easily up scalable drying method for drying nano- and microfibrillated cellulose.

SUMMARY OF THE INVENTION

The invention is defined by the features of the independent claims. Some specific embodiments are defined in the dependent claims.

According to an aspect of the present invention, there is provided a method for drying nano- or microfibrillated cellulose material.

This and other aspects, together with the advantages thereof over known solutions are achieved by the present invention, as hereinafter described and claimed.

The method of the present invention is mainly characterized by what is stated in the characterizing part of claim 1.

The nano- or microfibrillated cellulose material of the present invention is mainly characterized by what is stated in the characterizing part of claim 11.

Considerable advantages are obtained by means of the invention. Application of NFC/MFC to a possible substrate, where there is no adhesion between NFC/MFC and the substrate, by using a non-contact foam coating, enables efficient way to dry wet NFC/MFC to re-dispersible powder. The continuation process, milling and possible fractionation, enables the production NFC/MFC powder with specified particle distribution. One major advantage of the present invention is that the dried NFC/MFC materials are cheaper to transport, because of the low water-content. Another advantage is that the produced NFC/MFC materials can be easily tailored according to the desired end-use purposes.

Next, the present technology will be described more closely with reference to certain specific embodiments.

EMBODIMENTS

The present technology provides effective means for drying of nanofibrillated or microfibrillated cellulose (NFC or MFC).

FIG. 7 is a table summarizing the drying results in terms of used energy and related cost estimates.

FIG. 8 is a photo showing an example of nanocellulose film casted in Surface Treatment Concept (SutCo).

FIG. 9 is a photo showing an example of casted nanocellulose films in Surface Treatment Concept (SutCo).

Figure 1:
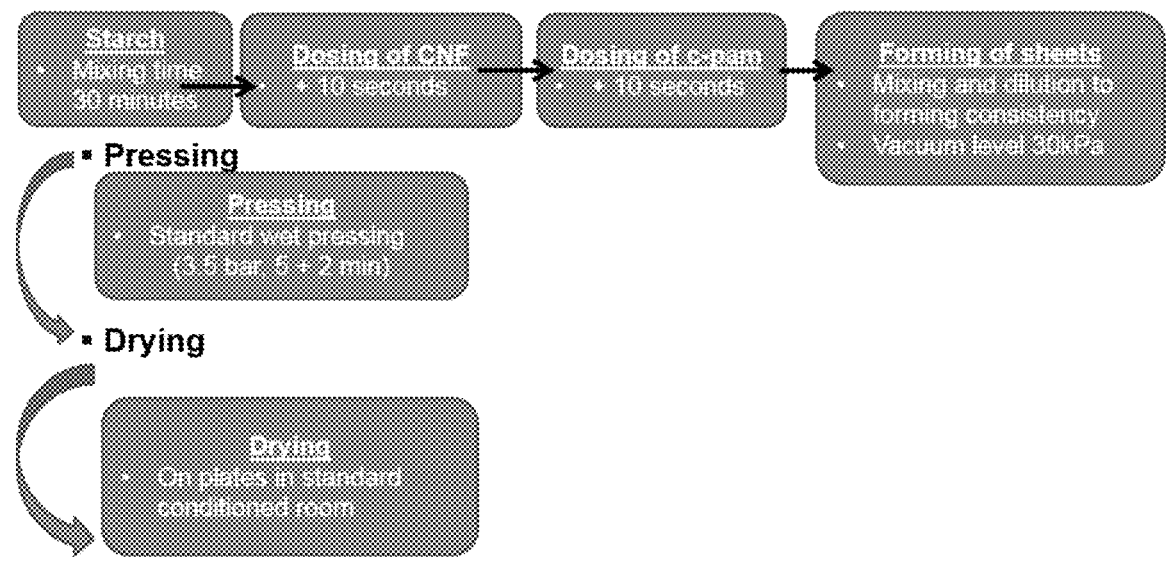
FIG. 1 is a process scheme describing one embodiment of the present invention.
Figure 2:
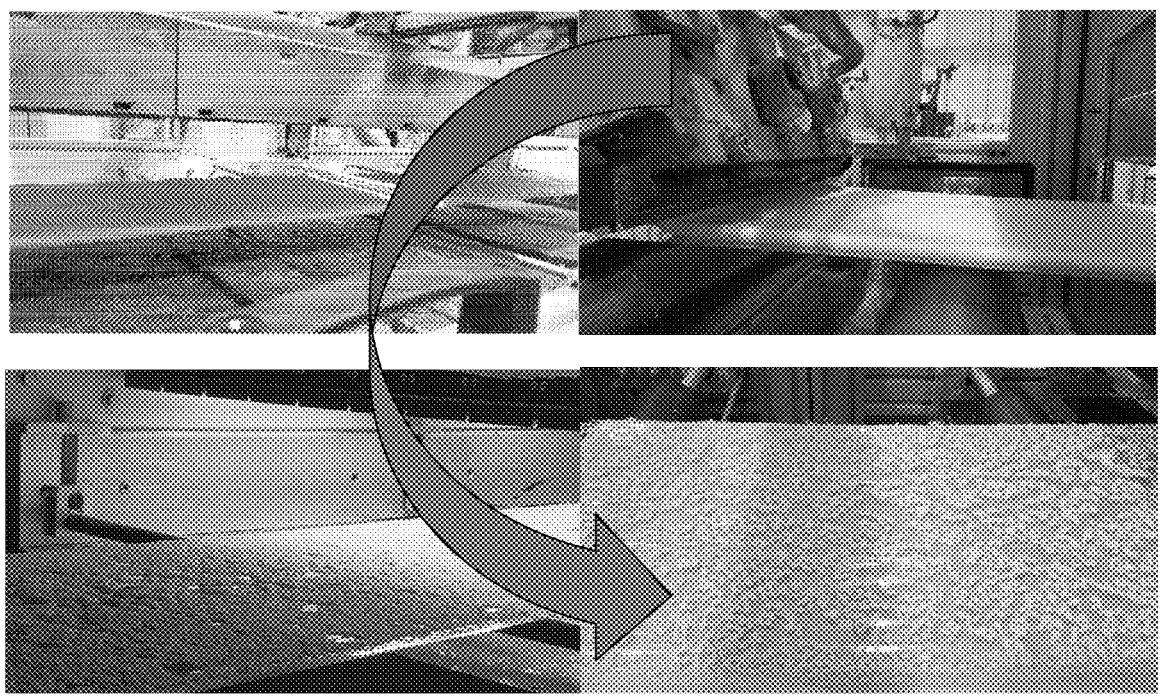
FIG. 2 is a photo collage showing the main steps of the method according to the present invention.

The present invention is based on mixing together NFC/MFC, native (i.e. unmodified) or modified, and a foaming agent, and foaming the mixture, after which the foamed mixture is dried.

According to one embodiment of the present invention, unmodified or modified NFC/MFC and a foaming agent is mixed together with for example pressurized air and foaming the mixture by using a foam generator. The foamed material mixture is then applied to a substrate by using a foam applicator. It is preferred that the used substrate does not have adhesion and does not absorb into the foamed material. The foamed material is then dried, for example by using a combination of dryers.

Thus, one embodiment of the present invention is mixing together native or modified NFC/MFC and a foaming agent with pressurized air and foaming the mixture by using a foam generator, where after the foamed material mixture is spread to a substrate, such as a wire, by using a foam applicator. After that, the NFC/MFC foam is dried by using a dryer or multiple driers. Drying of the foamed mixture creates dry and redispersible nano- or microfibrillated cellulose, which can be used as a raw material in various products. Foamed and foam-aid dried NFC/MFC is easily returnable back to fibre form, which is often critical for the functionality of the material in different applications.

The most common driers are IR (infra-red)-drying and air driers. The foaming process creates a foamy structure to the NFC/MFC material applied to the substrate and therefore the water evaporation simultaneously destroys the foam and enables drying of the NFC/MFC materials. The "foam killing process" should preferably happen fast, so that instead of film formation aggregates are formed. The dried NFC/MFC is then scraped from the substrate in the end of the coating line. The raw NFC/MFC powder can be furthermore milled for smaller particles and fractionized for a desired powder product.

According to one embodiment of the present invention, the present method uses a foaming agent, which is selected from anionic, non-ionic or amphoteric materials or material mixtures.

According to another embodiment of the present invention, the foaming agent is selected from sodium dodecyl sulphate (SDS) or polyvinyl alcohol (PVA), or is mixture of SDS and PVA. It is preferred that the foaming agent is used at a volume ratio of 1 to 5%, more preferably of 1 to 2%.

According to one embodiment of the present invention, the method uses air pressure, which is preferably adjusted to between 6 and 10 bars.

Suitable foam generators include any type of foam generators, which can be used to create foam, when using NFC/MFC materials together with a suitable foaming agent.

A nano- or microfibrillated cellulose material, which has been dried according to any of the method according to the present invention and milled into aggregates in order to promote the dispersion into water, also belongs to the scope of the present invention. As can be seen from the figures, the materials obtained by the method of the present invention and used as an enhancer in paper structures have increased mechanical properties, when compared to reference paper structure without the NFC/MFC materials according to the present invention. For example, an average increase in z-strength of at least 19% is reported herein, when compared to a cellulose material without such nano- or microfibrillated cellulose addition.

According to one embodiment, a water dispergation of the nano- or microfibrillated cellulose material according to the present invention has a maximum solid content of 20 wt-%, i.e. a maximum solid consistency of 20%. In other words, the method of the present invention is capable of drying the nano- or microfibrillated cellulose material into a maximum dry content of 99 wt-%. Such low water content enables easy and cost-effective means to dry and transport NFC/MFC also in a large scale.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

The method according to the present invention and the materials obtained thereof find applications in pulp and paper industry, bio composite industry and other industrial areas, which require nano- or microfibrillated cellulose materials in an essentially dry form. Thus, the materials according to the present invention can be used for example as enhancers in composite materials and/or structures when mixed together with other polymers, such as polypropylene and poly lactic acid. Other possible application areas include for example paints and/or coatings, films, rheology modifiers, emulsions and/or dispersions, medical, cosmetic and/or pharmaceutical applications, paper and/or board applications and hygiene and/or absorbent products.

EXAMPLES

General Method 1

Forming mixture consisted of gentle refined softwood and spruce-CTMP and the target basis weight was 160 gsm with the ratios 85% of gentle refined softwood and 15% of spruce-CTMP. Forming of board structures were carried out with vacuum assisted sheet former simulating production conditions. The characteristics of the forming device:

High vacuum (up to 70 kPa) can be utilized during dewatering.
Area of formed sheet is 320×220 mm.
Similar forming fabrics than on a board machine surroundings can be used.
Water samples can be collected (first pass retention and filtrate) into two separated tanks and further analyzed.
Fresh water or white water circulation can be used.
Basis weight from 10 gsm up to 2000 gsm.
Four different CNF samples dried at Surface Treatment Concept (SutCo) were used when forming board structures:
VTT Coarse grade SDS based foaming
VTT Coarse grade Mowiflex C30 based foaming
HefCel grade SDS based foaming
HefCel grade Mowiflex C30 based foaming The dried CNF grades were re-dispersed with tap water within consistency range 0.5-2.0 wt-%. The homogeneity of CNF dispersions were enhanced by utilizing either high shear dispergator or Ultra Turrax homogenizer. Antifoam agent was used to prevent foam formation during the mixing phase. The dosage of the used antifoam agent was 0.25‰.

The following forming procedure was applied when forming board structures. At first, starch was mixed with furnish mixture for 30 minutes. The conductivity of furnish mixture was adjusted to the level around 1000 µS/cm and pH around 7.5. The dosage of CNF was 3% from the used dry amount of fibres. The delay time was short when dosing CNF or c-pam simulating industrial scale delay times when dosing additives in the wet-end conditions. The sheets were wet pressed according to the standard wet pressing conditions and the wet pressed board sheets were dried on the plates. All board samples were stored and analysed in a standard conditioned room at RH 50% and 23° C. FIG. 1 describes such used method.

Figure 3:
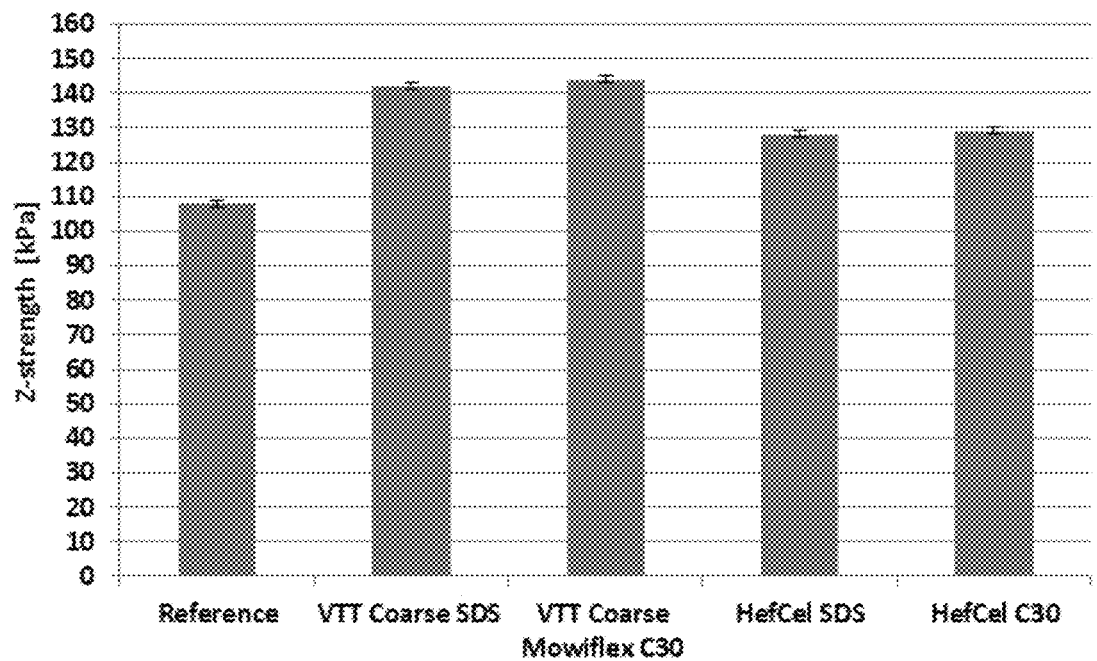
FIGS. 3 to 6 are diagrams disclosing mechanical properties of the dried cellulose material in terms of Z-strength (FIG. 3), tensile index (FIG. 4), strain at break (FIG. 5) and modulus of elasticity (FIG. 6).

The z-directional tensile strength (FIG. 3) was measured according to ISO standard 15754:2009.

Figure 4:
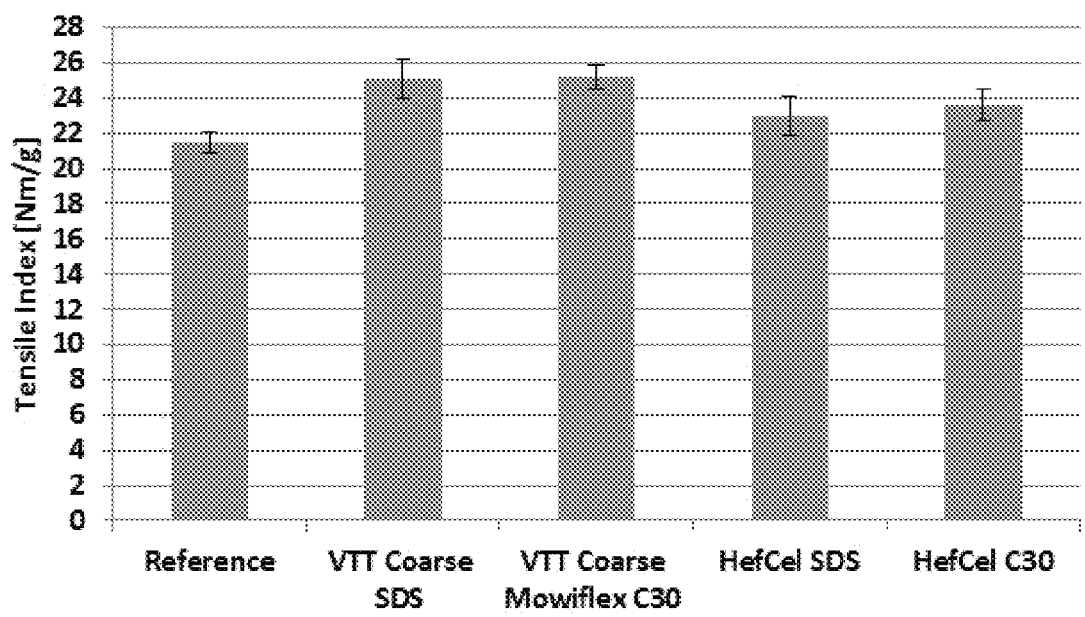
Figure 5:
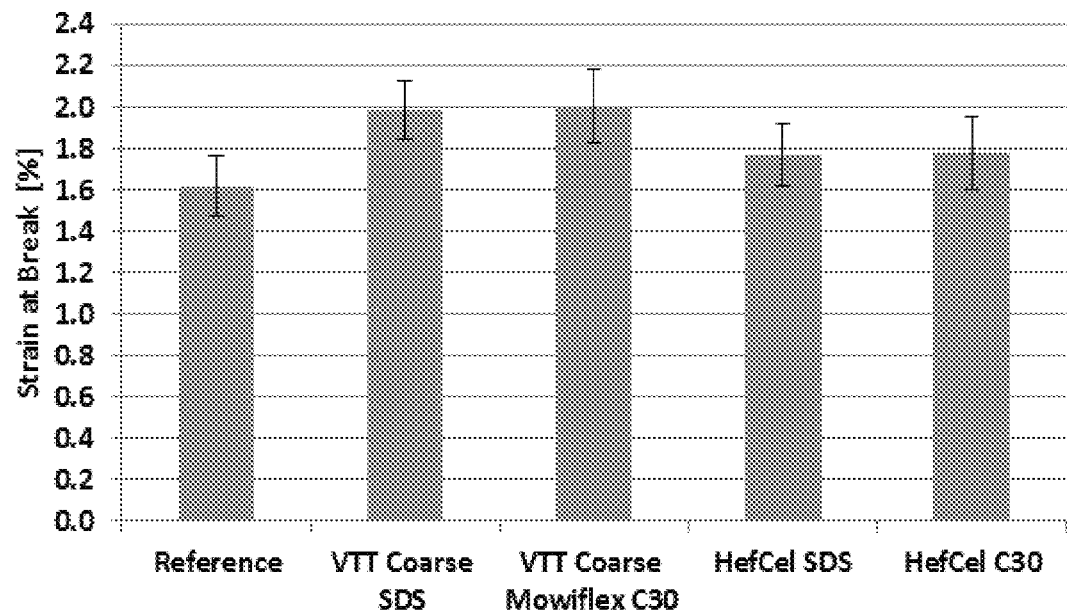
Figure 6:
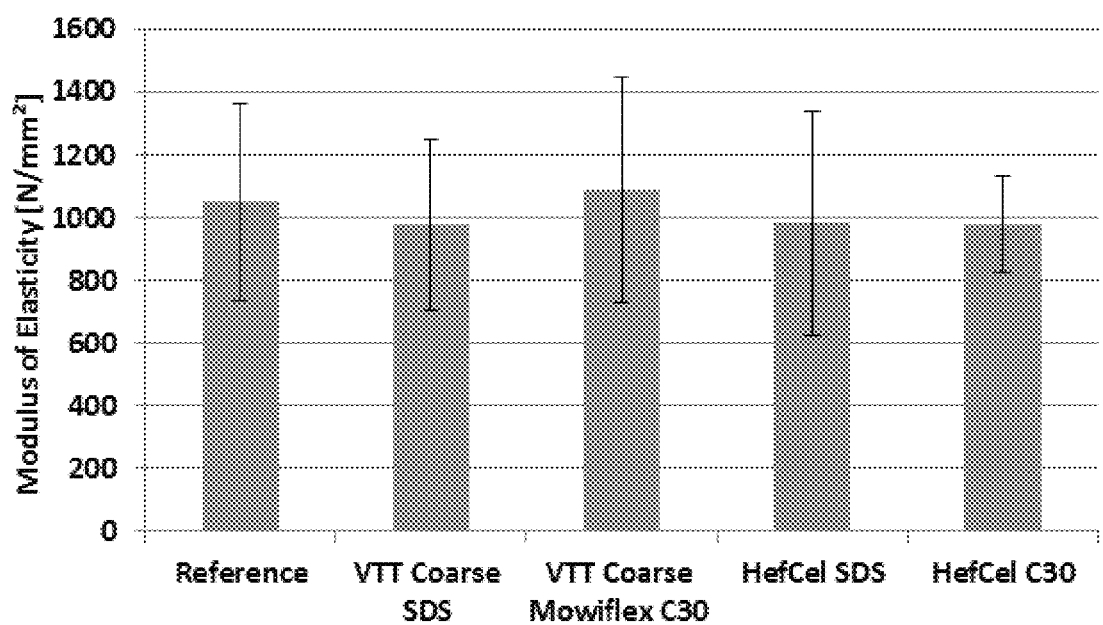

The tensile strength properties of paper samples (FIGS. 4-6) were measured by using a Lloyd tensile tester, in accordance with ISO standard 5270:1998.

General Method 2

Four different CNF samples dried at SUTCO line were melt mixed with polypropylene (PP) and polylactide (PLA). Melt mixing was done with twin-screw extruder. Prior mixing CNF—samples were dried overnight in vacuum oven at a temperature of 40° C. Paraffin oil was used to ensure uniform feeding of the fluffy CNF (to make polypropylene granulates sticky). Coupling agent linseed oil worked also as sticky agent for PLA. Produced compounds were then fabricated to tensile testing bars by injection molding machine. Testing bars were measured with Instron testing machine.

Materials
Matrix
  Polylactide: Ingeo Biopolymer 3001D (Nature Works LLC)
  Polypropylene: PP Homopolymer HNR100 (Sasol)
Compatibilizers/Coupling Agent
  PLA: Vikoflex® 7190 Epoxidized Linseed Oil (Arkema)
  PP: Licocene PP MA 7452 GR TP (Clariant)
Additives
  Paraffin oil, pharmacy grade
Melt-Mixing
Equipment
  Krauss Maffei Berstorff Ze25Ax49D UTX
Mixing Parameters
  Tprof: 35° C. Zone 1, 200-200° C. Zones 2-11
  Mixing speed: 100 RPM
  Throughput: 6 kg/h
  Water bath and granulator
Injection Moulding
Equipment
  Engel ES 200/50 HL
IM Parameters
Tprof: Zones 1-4 220-220° C., Zone 5 200° C.
Recipes
  Used recipes in the experiment are shown in Table 1.

TABLE 1

| | Matrix | % | CNF | % | Coupling agent | % | Paraffin oil % |
|---|---|---|---|---|---|---|---|
| PP-Serie | | | | | | | |
| DF-1 | Neat PP | 96.5 | | | | 3 | 0.5 |
| DF-2 | PP | 95.5 | SDS | 1 | Licocene | 3 | 0.5 |
| DF-3 | PP | 94.5 | SDS | 2 | Licocene | 3 | 0.5 |
| DF-4 | PP | 95.5 | Mowiflex | 1 | Licocene | 3 | 0.5 |
| DF-5 | PP | 94.5 | Mowiflex | 2 | Licocene | 3 | 0.5 |
| DF-6 | PP | 94.5 | SDS-HefCell | 2 | | 3 | 0.5 |
| DF-7 | PP | 94.5 | Mowi-Hefcell | 2 | | 3 | 0.5 |
| PLA-serie | | | | | | | |
| DF-8 | PLA | 99.8 | | | | | 0.2 |
| DF-9 | PLA | 98.9 | SDS | 1 | Vikoflex | | 0.2 |
| DF-10 | PLA | 97.8 | SDS | 2 | Vikoflex | | 0.2 |
| DF-11 | PLA | 98.9 | Mowiflex | 1 | Vikoflex | | 0.2 |
| DF-12 | PLA | 97.8 | Mowiflex | 2 | Vikoflex | | 0.2 |
| DF-13 | PLA | 98.9 | SDS-HefCell | 1 | Vikoflex | | 0.2 |
| DF-14 | PLA | 97.8 | SDS-HefCell | 2 | Vikoflex | | 0.2 |
| DF-15 | PLA | 98.9 | Mowi-Hefcell | 1 | Vikoflex | | 0.2 |
| DF-16 | PLA | 97.8 | Mowi-Hefcell | 2 | Vikoflex | | 0.2 |

Film Casting
  One CNF sample dried at Surface Treatment Concept (SutCo) was used when film was casted:
  VTT Fine grade SDS based foaming
  The dried CNF grade was re-dispersed with tap water within consistency range 0.5-2.0 wt-%. The homogeneity of CNF dispersion was enhanced by utilizing Ultra Turrax homogenizer. Antifoam agent was used to prevent foam formation during the mixing phase. The dosage of the used antifoam agent was 0.25%.
  When film was casted the dosage of Sorbitol was 21 wt-% (based on the amount of dry fiber). The consistency in film casting was 1.8 wt-%. The used substrate in film casting was polypropanol-based film, which was pretreated by plasma (100 W min/m$^2$) in order to achieve right adhesion level between substrate and nanocellulose film. Nanocellulose film was casted using SutCo (see FIGS. 8 and 9).
  The length of the film was 4.8 m and the width of the film was 0.21 m. The fact that translucent nanocellulose film was made clearly indicates that the dried nanocellulose was dispersed to fibril form. The creation of film requires fibres with good bonding ability. If dried nanocellulose consists of particle like aggregates, they are not able to form films.

Plastic Composite
  Two CNF sample dried at Surface Treatment Concept (SutCo) was used when film was casted:
  VTT Coarse grade Marlipal O13/100 based foaming
  VTT Coarse grade Marlipal O13/100 based foaming with Poly(acrylamide-co-acrylic acid) partial sodium salt (PAA). Amount of PAA was 6 wt-% of CNF.
  PAA was added already during foaming phase and the purpose of it is to help dispersion of CNF. As a plastic matrix PLA was used. Compounding to 30% CNF and 70% PLA was done using twin-screw extruder. The dried CNF could be added to the extruder without any pre-treatment and the processing was easy. This was a big difference compared to freeze dried CNF, which requires two stage dispersion before it can be added to the extruder. Production scale injection moulding machine (Engel ES 200/50 HL) was used to produce test samples. The results are shown in table 2.

TABLE 2

| Samples | Young's Modulus [Mpa] | Strain at Break [%] | Charpy Impact Strength [kJ/m$^2$] |
|---|---|---|---|
| PLA | 3221 | 3.5 | 16.6 |
| 70% PLA + 30% CNF | 606 | 50.2 | 70.1 |
| 70% PLA + 30% CNF + PAA | 511 | 57.7 | 82.7 |

By adding 30% CNF to PLA matrix strain at break and charpy impact strength grow dramatically, whereas Young's modulus drops sharply. The structure transforms from hard and rigid to elastic material. The adding of PAA enhances dispersion of CNF, leading the material that is even more elastic. The results show, that foam dried CNF can be used as a dry state in plastic process and it can have drastic effect to the properties of plastic compounds.

CITATION LIST

Patent Literature

WO 2016/068787

The invention claimed is:
1. A method for drying nano- or micro-fibrillated cellulose comprising at least the steps of:
  mixing together unmodified or modified nano- or micro-fibrillated cellulose and a foaming agent and foaming the mixture,
  spreading the foamed mixture on a substrate that does not adhere to the foamed mixture and does not absorb into the foamed mixture, and
  drying the foamed mixture.
2. The method according to claim 1, further comprising drying the nano- or micro-fibrillated cellulose into a maximum dry content of 99 wt-%.
3. The method according to claim 1, wherein the foaming agent is selected from anionic, non-ionic or amphoteric materials or material mixtures.

4. The method according to claim 3, wherein the foaming agent is selected from sodium dodecyl sulphate (SDS) or polyvinyl alcohol (PVA), or is a mixture of SDS and PVA.

5. The method according to claim 1, wherein the foaming agent is used at a volume ratio of 1 to 5%.

6. The method according to claim 1, wherein the cellulose and foaming agent are further mixed with pressurized air and foamed using a foam generator.

7. The method according to claim 6, wherein the air pressure is adjusted between 6 and 10 bars.

8. The method according to claim 1, further comprising drying the nano- or micro-fibrillated cellulose into a maximum dry content of 99 wt-% with a drier, selected from infrared or air driers, or their combination.

9. A nano- or micro-fibrillated cellulose material, wherein it the nano- or micro-fibrillated cellulose material has been dried according to the method of claim 1.

10. The nano- or micro-fibrillated cellulose material according to claim 9, wherein the nano- or micro-fibrillated cellulose material has been milled into aggregates.

11. The nano- or micro-fibrillated cellulose material according to claim 9, wherein it increases z-strength of at least 19%, when compared to a reference cellulose material without nano- or micro-fibrillated cellulose material addition.

12. A water dispergation of the nano- or micro-fibrillated cellulose material according to claim 9 having a maximum consistency of 20%.

13. Use of the nano- or micro-fibrillated cellulose material according to claim 9 as an enhancer in composite materials and/or structures, in paints and/or coatings, in films, in rheology modifiers, in emulsions and/or dispersions, in medical, cosmetic and/or pharmaceutical applications, in paper and/or board applications and/or in hygiene and/or absorbent products.

14. The method according to claim 2 wherein the foaming agent is selected from anionic, non-ionic or amphoteric materials or material mixtures.

15. The method according to claim 14, wherein the foaming agent is selected from sodium dodecyl sulphate (SDS) or polyvinyl alcohol (PVA), or is a mixture of SDS and PVA.

16. The method according to claim 1, wherein the foaming agent is used at a volume ratio of 1 to 2%.

17. The method according to claim 2, further comprising mixing together native or modified nano- or micro-fibrillated cellulose and a foaming agent with pressurized air and foaming the mixture by using a foam generator.

18. The method according to claim 3, further comprising mixing together native or modified nano- or micro-fibrillated cellulose and a foaming agent with pressurized air and foaming the mixture by using a foam generator.

19. The method according to claim 1, wherein the method obtains re-dispersibility of the unmodified or modified nano- or micro-fibrillated cellulose.

20. The nano- or microfibrillated cellulose material of claim 9, wherein the unmodified or modified nano- or micro-fibrillated cellulose is re-dispersible.

* * * * *